United States Patent
Mizutani et al.

(10) Patent No.: US 7,443,541 B2
(45) Date of Patent: Oct. 28, 2008

(54) IMAGE PROCESSING APPARATUS AND IMAGE PROCESSING METHOD

(75) Inventors: Toshiyuki Mizutani, Hachioji (JP); Kenichiro Hiramoto, Hachioji (JP)

(73) Assignee: Konica Minolta Holdings Inc., Tokyo (JP)

( * ) Notice: Subject to any disclaimer, the term of this patent is extended or adjusted under 35 U.S.C. 154(b) by 681 days.

(21) Appl. No.: 11/120,289

(22) Filed: May 2, 2005

(65) Prior Publication Data

US 2005/0253882 A1 Nov. 17, 2005

(30) Foreign Application Priority Data

May 12, 2004 (JP) .............................. 2004-142271

(51) Int. Cl.
*H04N 1/405* (2006.01)
*H04N 1/407* (2006.01)

(52) U.S. Cl. .................... 358/3.02; 358/3.03; 358/3.06; 358/3.13; 358/3.21

(58) Field of Classification Search .................. 358/1.9, 358/3.02, 3.03, 3.05, 3.06, 3.09, 3.1, 3.12, 358/3.13, 3.14, 3.21, 3.22, 534, 466; 382/252, 382/270; 347/15
See application file for complete search history.

(56) References Cited

U.S. PATENT DOCUMENTS 6,439,682 B1 8/2002 Kakutani
7,322,664 B2 * 1/2008 Kakutani et al. ............. 358/1.9
2006/0209113 A1 * 9/2006 Katsuyama ................... 347/15

FOREIGN PATENT DOCUMENTS

| JP | 2000-108420 A | 1/2000 |
|---|---|---|
| JP | 2000-253247 A | 9/2000 |

OTHER PUBLICATIONS

Japanese Office Action (and English translation thereof) dated Jul. 29, 2008, issued in a counterpart Japanese Application.

* cited by examiner

*Primary Examiner*—Scott A Rogers
(74) *Attorney, Agent, or Firm*—Frishauf, Holtz, Goodman & Chick, P.C.

(57) ABSTRACT

An image processing apparatus includes: a recording rate determining section for determining a recording rate of each of a plurality of dot types having different densities per unit area from each other according to an input value including a multi-gradation image data, the input value being quantized for forming a dot of the plurality of dot types; a dot formation judging section for judging whether the dot is to be formed on each pixel based on a sum total of each recording rate of the plurality of dot types; and a dot selecting section for selecting a dot type among the plurality of dot types having different densities per unit area from each other to a pixel on which the dot formation judging section judges that the dot is to be formed, wherein an image is formed according to an arrangement distribution of the dot.

20 Claims, 13 Drawing Sheets

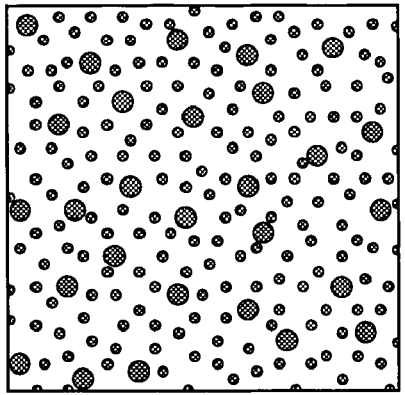
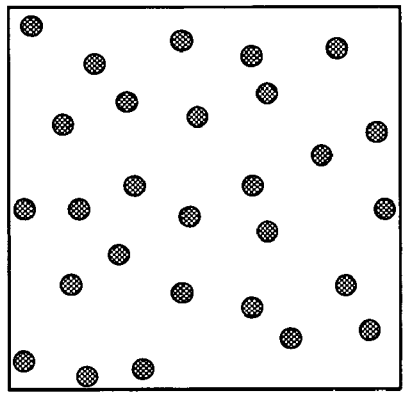
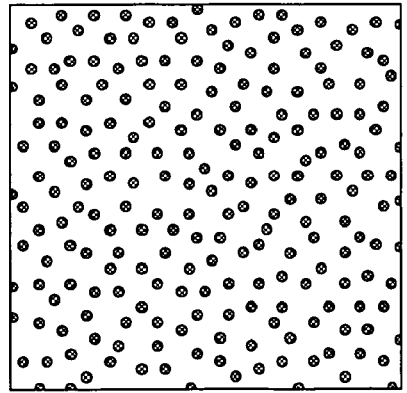
FIG.7A  SUM TOTAL 8.5%
FIG.7B  SELECT LARGE DOT 1%
FIG.7C  LARGE AND SMALL DOT 8.5%

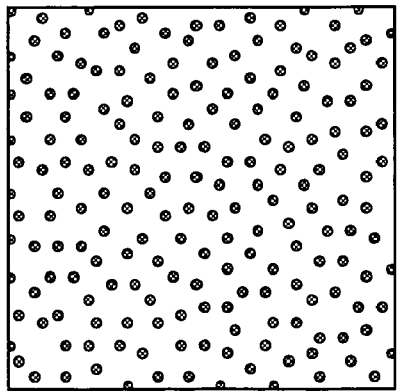
*FIG 8A* SUM TOTAL 8.5%
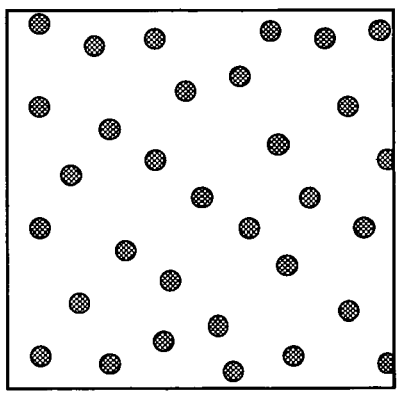
*FIG 8B* SELECT LARGE DOT 1%
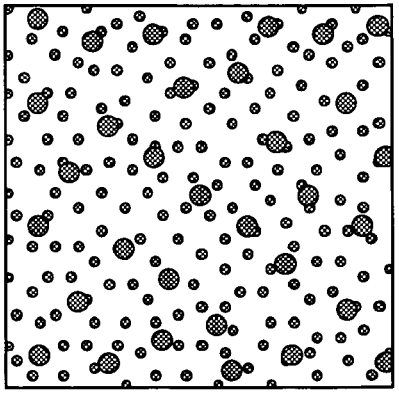
*FIG 8C* LARGE AND SMALL DOT 8.5%

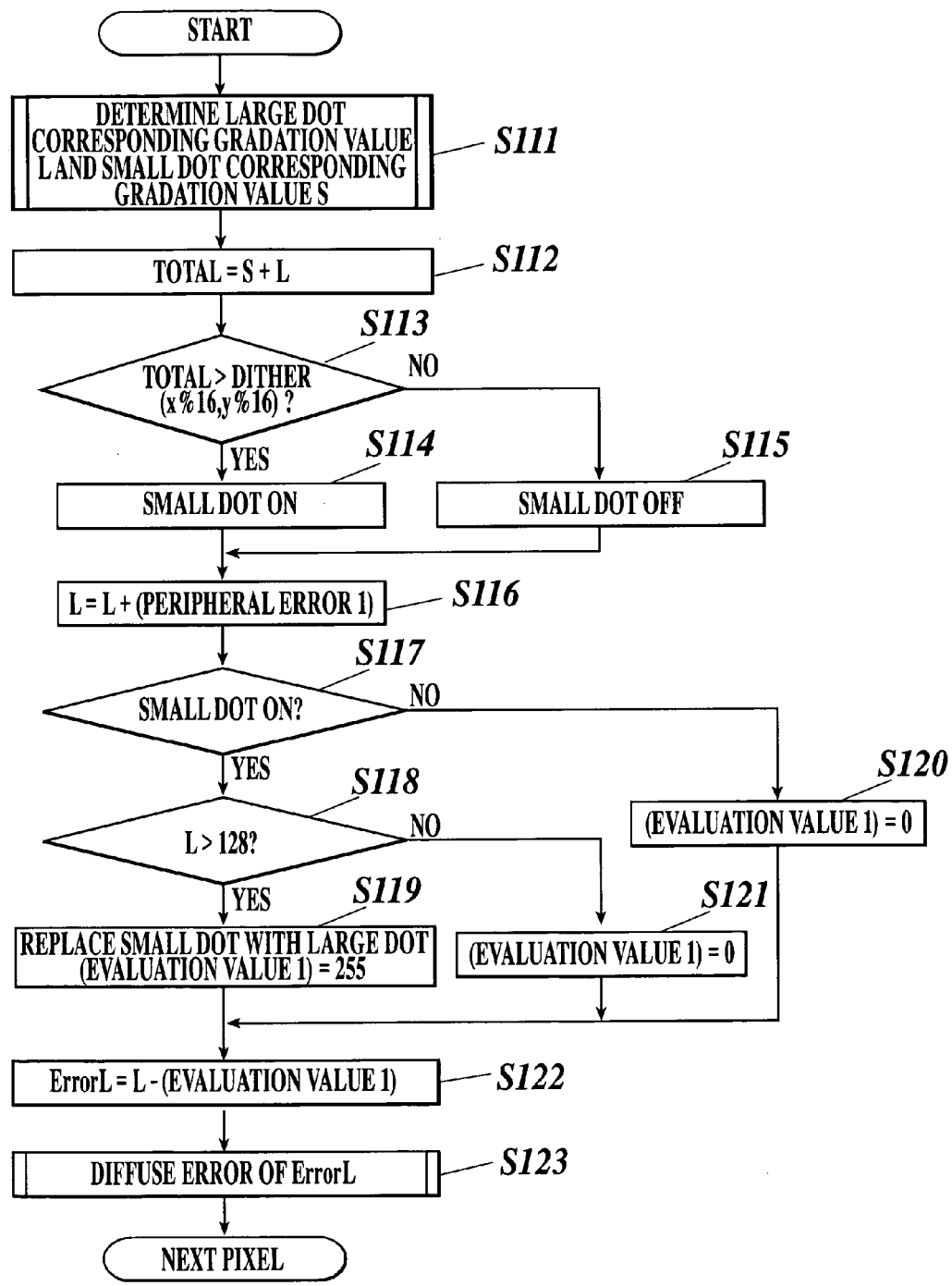

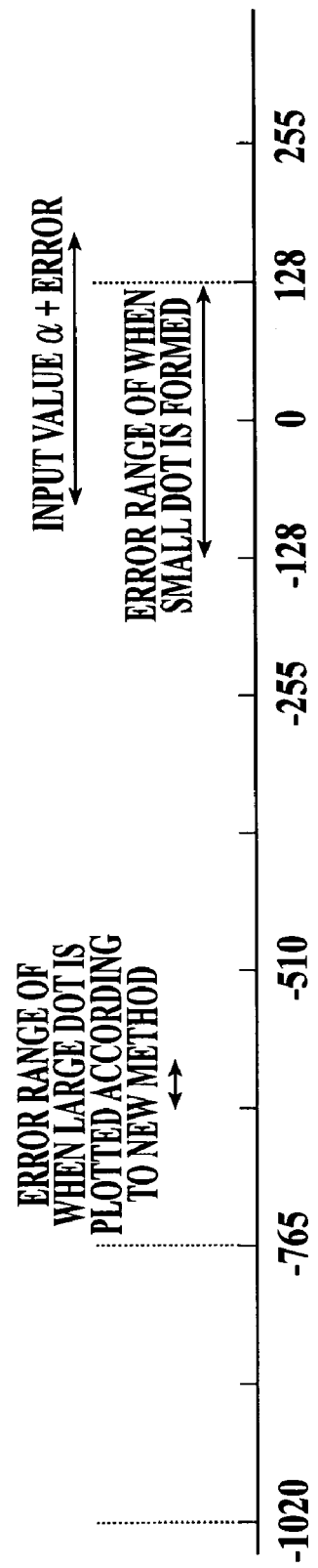

IMAGE PROCESSING APPARATUS AND IMAGE PROCESSING METHOD

BACKGROUND OF THE INVENTION

1. Field of the Invention

The present invention relates to an image processing apparatus and an image processing method. In particular, the present invention relates to an image processing apparatus and an image processing method for forming an image on a recording medium by using a plurality of dot types having different densities per unit area from each other.

2. Description of Related Art

So far, what is available as a printing apparatus for printing an image from a personal computer or the like, is a printer using inks of three colors: cyan (C), magenta (M) and yellow (Y), and a printer using inks of four colors: the above-mentioned three colors and black (K), that is, CMYK. These printers form an image by ON/OFF of dots of each color.

Meanwhile, these days, we can often see a printer performing a printing by forming dots having a plurality of gradation levels in one color, by using inks having different densities from each other in the same color, or by differentiating dot diameters of inks in the same color.

However, although it is possible to form dots having a plurality of gradation levels in one color as mentioned above, an image can be deteriorated when these dots are not properly arranged. For example, when, in order to obtain an output image having a thick dot (dot having a high density per unit area) and a thin dot (dot having a low density per unit area), a halftone process of binarization is applied to the respective dots, and thereafter, the respective pixel values are added to each other, although a dot diffusion of the thick dots only (see FIG. 8B) and a dot diffusion of the thin dots only (see FIG. 8A) are in good conditions, when both the diffusions are overlapped, there are many cases in which the overlapped diffusion cannot be regarded as a good diffusion as a whole. After all, a conclusive granularity is deteriorated to a large degree (see FIG. 8C).

Therefore, various methods with respect to arranging dots of a plurality of dot types having different densities from each other per unit area have been proposed (see JP-Tokukai-2004-1311A, JP-Tokukai-2003-80682A, JP-Tokukai-2000-125121A and Japanese Patent 3208777).

Among these methods, in JP-Tokukai-2004-1311A, a portion in which a plurality of small dots are gathered as a block is replaced with a medium dot, and further a portion in which a plurality of medium dots are gathered as a block is replaced with a large dot.

Further, in JP-Tokukai-2003-80682A, by plotting thin dots at not less than 100%, and when a density difference between the thin dots and thick dots is small, a plotting of thick dots starts.

Further, in JP-Tokukai-125121A, a dot arrangement is made by calculating a dot occupancy of a large dot according to an input value, and thereafter, a three-value halftone process for the input value is performed for allocating one of: plotting a large dot; plotting a small dot; and not plotting a dot.

Further, in Japanese Patent No. 3208777, an input value is broken down into a dot rate between a thick dot and a thin dot, and, in order to have a better thick dot diffusion, a thick dot arrangement is first determined by performing a halftone process to the thick dots, and thereafter, a dot rate of a thin dot is corrected based on the result of the halftone process to the thick dots. Then, a halftone process is performed to the thin dots for determining a thin dot arrangement.

However, in the above-mentioned JP-Tokukai-2004-1311A, a pseudo outline is generated by replacing the dot diameters, and further, when an image is formed of dots having a small dot diameter, a banding due to dot formation unevenness becomes rather noticeable.

Further, in JP-Tokukai-2003-80682A, it is not possible to restrict ink amount, and a type of usable paper is limited.

Further, in JP-Tokukai-2000-125121A, since it is not possible to obtain a favorable image in view of respective dot diffusions, especially a noticeable large dot diffusion, a granularity worsens.

Further, in Japanese Patent No. 3208777, since the thin dot diffusion is disturbed by the thick dots, especially when dot weight is considered, a granularity rather increases. Here, this problem will be described later in detail in an embodiment of the present invention.

SUMMARY OF THE INVENTION

An object of the present invention is to provide an image processing apparatus and an image processing method that are capable of making a dot diffusion favorable when an image is formed on a recording medium by using a plurality of dot types having different densities per unit area from each other.

In order to realize the object, in accordance with a first aspect of the present invention, an image processing apparatus of the present invention comprises: a recording rate determining section for determining a recording rate of each of a plurality of dot types having different densities per unit area from each other according to an input value comprising a multi-gradation image data, the input value being quantized for forming a dot of the plurality of dot types; a dot formation judging section for judging whether the dot is to be formed on each pixel based on a total recording rate which is a sum total of each recording rate of the plurality of dot types, determined by the recording rate determining section; and a dot selecting section for selecting a dot type among the plurality of dot types having different densities per unit area from each other, to a pixel on which the dot formation judging section judges that the dot is to be formed, wherein an image is formed according to an arrangement distribution of the dot.

According to such an image processing apparatus, the image processing apparatus comprises a recording rate determining section for determining a recording rate of each of a plurality of dot types having different densities per unit area from each other according to an input value comprising a multi-gradation image data, the input value being quantized for forming a dot of the plurality of dot types; a dot formation judging section for judging whether the dot is to be formed on each pixel based on a total recording rate which is a sum total of each recording rate of the plurality of dot types having different densities determined by the recording rate determining section; and a dot selecting section for selecting a dot type among the plurality of dot types having different densities to a pixel on which the dot formation judging section judges that the dot is to be formed. Therefore, a halftone process for determining the recording rate of each of the plurality of dot types having different densities per unit area from each other according to the input value and for judging whether the dot is to be formed based on a sum total of the recording rates is performed. By this process, ON/OFF of all the dots having the plurality of dot types having different densities is determined, whereby it is possible to improve a dot diffusion in regard to all the dots having the plurality of dot types having different densities.

As a result, it is possible to form a favorable image.

In accordance with a second aspect of the present invention, an image processing apparatus of the present invention comprises: a recording rate determining section for determining a recording rate of each of a plurality of dot types having different densities per unit area from each other according to an input value comprising a multi-gradation image data, the input value being quantized for forming a dot of the plurality of dot types; a dot formation judging section for determining a total recording rate by summing each recording rate of the plurality of dot types having different densities per unit area from each other, and for judging whether a dot of a dot type among the plurality of dot types having different densities per unit area from each other is to be formed on each pixel temporarily, based on the total recording rate; and a dot selecting section for selecting whether to replace the dot of the dot type among the plurality of dot types having different densities per unit area from each other, judged to be formed on the pixel temporarily by the dot formation judging section, with a dot of another dot type among the plurality of dot types having different densities per unit area from each other, wherein an image is formed according to an arrangement distribution of the dot.

According to such an image processing apparatus, the image processing apparatus comprises a recording rate determining section for determining a recording rate of each of a plurality of dot types having different densities per unit area from each other according to an input value comprising a multi-gradation image data, the input value being quantized for forming a dot of the plurality of dot types; a dot formation judging section for determining a total recording rate by summing each recording rate of the plurality of dot types having different densities determined by the recording rate determining section, and for judging whether a dot of one dot type among the plurality of dot types having different densities per unit area from each other is to be formed on each pixel temporarily based on the total recording rate; and for dot selecting section for selecting whether the dot of the one dot type which is judged to be formed temporarily on a pixel among the plurality of dot types having different densities per unit area from each other by the dot formation judging section, is to be replaced with a dot of another dot type among the plurality of dot types having different densities. Therefore, a halftone process for determining the recording rate of each of the plurality of dot types having different densities per unit area from each other according to the input value, and for judging whether the dot is to be formed based on the sum total of the recording rates is performed. By this process, ON/OFF of all the dots having the plurality of dot types having different densities is determined, whereby it is possible to improve a dot diffusion in regard to all the dots having the plurality of dot types having different densities.

As a result, it is possible to form a favorable image.

In accordance with a third aspect of the present invention, an image processing apparatus of the present invention comprises: a recording rate determining section for determining at least one recording rate of a dot type among a plurality of dot types having different densities per unit area from each other according to an input value comprising a multi-gradation image data, the input value being quantized for forming a dot of the plurality of dot types, and for determining a total recording rate which is a sum total of each recording rate of the plurality of dot types having different densities per unit area from each other; a dot formation judging section for judging whether the dot is to be formed on each pixel based on the total recording rate determined by the recording rate determining section; a dot selecting section for selecting a dot type among the plurality of dot types having different densities per unit area from each other, to a pixel on which the dot formation judging section judges that the dot is to be formed, wherein an image is formed according to an arrangement distribution of the dot.

According to such an image processing apparatus, the image processing apparatus comprises: a recording rate determining section for determining at least one recording rate of a plurality of dot types having different densities per unit area from each other according to an input value comprising a multi-gradation image data, the input value being quantized for forming a dot of the plurality of dot types, and for determining a total recording rate which is a sum total of each recording rate of the plurality of dot types having different densities; a dot formation judging section for judging whether the dot is to be formed on each pixel based on the total recording rate determined by the recording rate determining section; and a dot selecting section for selecting a dot type among the plurality of dot types having different densities to a pixel on which the dot formation judging section judges that the dot is to be formed. Therefore, a halftone process for determining at least one recording rate of the plurality of dot types having different densities per unit area from each other according to the input value, for determining the total recording rate which is the sum total of each recording rate of the plurality of dot types having different densities, and for judging whether the dot is to be formed based on the total recording rate, is performed. By this process, ON/OFF of all the dots having the plurality of dot types having different densities is determined, whereby it is possible to improve a dot diffusion in regard to all the dots having the plurality of dot types having different densities.

As a result, it is possible to form a favorable image.

In accordance with a fourth aspect of the present invention, an image processing method of the present invention comprises: determining a recording rate of each of a plurality of dot types having different densities per unit area from each other according to an input value comprising a multi-gradation image data, the input value being quantized for forming a dot; judging whether the dot is to be formed on each pixel based on a total recording rate which is a sum total of each determined recording rate of the plurality of dot types having different densities per unit area from each other; and selecting a dot type among the plurality of dot types having different densities per unit area from each other, to a pixel on which it is judged that the dot is to be formed, wherein an image is formed according to an arrangement distribution of the dot.

According to such an image processing method, the image processing method comprises: determining a recording rate of each of a plurality of dot types having different densities per unit area from each other according to an input value comprising a multi-gradation image data, the input value being quantized for forming a dot of the plurality of dot types; judging whether the dot is to be formed on each pixel based on a total recording rate which is a sum total of each of the determined recording rates of the plurality of dot types having different densities; and selecting a dot type among the plurality of dot types having different densities to a pixel on which it is judged to form the dot. Therefore, a halftone process for determining the recording rate of each of the plurality of dot types having different densities per unit area from each other according to the input value, and for judging whether the dot is to be formed based on the sum total of the recording rates, is performed, whereby it is possible to improve a dot diffusion in regard to all the dots having the plurality of dot types having different densities.

As a result, it is possible to form a favorable image.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein:

FIG. 7A is a view showing an image formed by using only small dots for all the dots, FIG. 7B is a view showing an image showing only dots selected as large dots, among all the dots shown in FIG. 7A, FIG. 7C is a view showing an image having all the dots shown in FIG. 7A with the dots shown in FIG. 7B replaced with large dots, FIG. 8A is a view showing an image showing a result of a halftone process to a small dot in a comparative example, FIG. 8B is a view showing an image showing a result of a halftone process to a large dot in the comparative example, FIG. 8C is a view showing an image showing a result of overlapping FIG. 8A and FIG. 8B in the comparative example, FIG. 9 is a flowchart illustrating a halftone process in a second embodiment, FIG. 11 is an explanatory view of the halftone process in the third embodiment.

PREFERRED EMBODIMENTS OF THE INVENTION

Hereinafter, an image processing apparatus and an image processing method relating to embodiments of the present invention will be described with reference to drawings. However, the present invention is not limited to represented descriptions.

First Embodiment

First, a first embodiment will be described with reference to FIG. 1 to FIG. 6.

Figure 1:
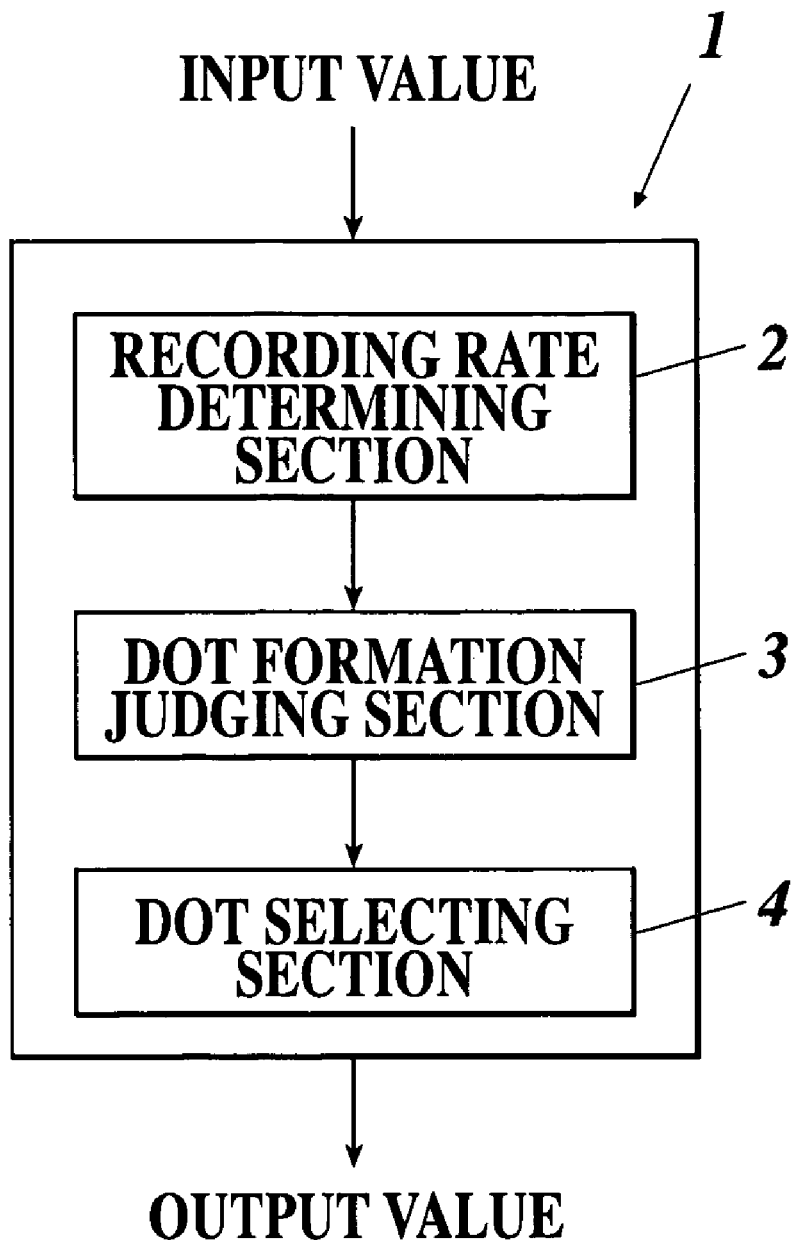
FIG. 1 is a block diagram showing a rough structure of an image processing apparatus relating to the present invention.

FIG. 1 is a block diagram showing a rough structure of an image processing apparatus 1 relating to the first embodiment.

The image processing apparatus is an apparatus loadable on a known output apparatus (image recording apparatus) such as an inkjet printer or the like. The image processing apparatus 1 is an apparatus for quantizing an input value at each pixel, the input value comprising a multi-gradation image data in which image data having predetermined bit number (predetermined gradation number) is allocated to each pixel that structures an image, and for converting the quantized value into an output value comprising a pseudo halftone image data.

As shown in FIG. 1, the image processing apparatus 1 comprises a recording rate determining section 2 for realizing a recording rate determining function in a recording rate determining step which will be described later; a dot formation judging section 3 for realizing a dot formation judging function in a dot formation judging step; a dot selecting section for realizing a dot selecting function in a dot selecting step, and the like.

Further, each section of the image processing apparatus 1 comprises a CPU (Central Processing Unit), a ROM (Read Only Memory), a RAM (Random Access Memory) and the like. Then, in the image processing apparatus 1, an image processing program for processing an image data is stored in the ROM, and the CPU reads out the image processing program stored in the ROM and executes various processes comprising the above-mentioned functions according to the image processing program by using the RAM as a work area. In other words, the image processing program makes the CPU of the image processing apparatus 1 execute various processes described later.

Next, an image processing method in the first embodiment will be described.

First, a method for forming dots of a plurality of dot types having different densities per unit area from each other in one color will be described. Here, as a method for forming dots of the plurality of dot types having different densities per unit area from each other, a method of changing an ink density at each dot in the same color, a method of changing a dot diameter of each dot and the like can be used.

The changing an ink density can be performed according to a structure in which an ink of a thin color and an ink of a thick color are preliminarily prepared, and the respective inks are jetted by different heads, or a nozzle for jetting the respective inks is provided in the same head. Further, when a liquid ink is used, a thin color may be realized by mixing an ink of a thick color and a transparent ink.

Figure 2:
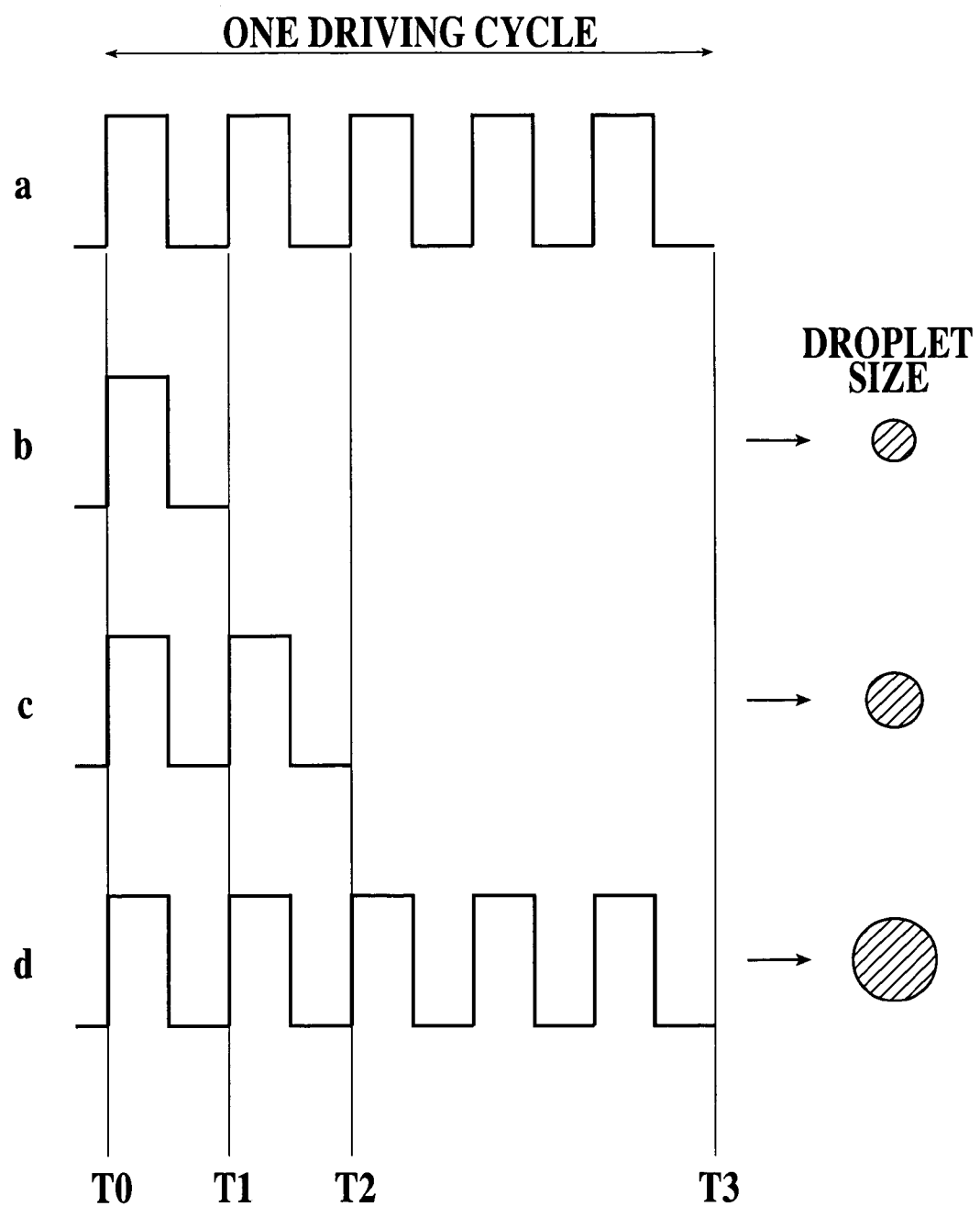
FIG. 2 is a view showing a relation between an activation cycle of a head and a dot diameter.

Further, as for the changing of a dot diameter, as shown in FIG. 2 for example, a dot diameter (a size of a droplet) can be changed by adjusting an activation cycle of the head of the inkjet printer. In other words, when the activation cycle is short, the dot diameter becomes small, and on the contrary, when the activation cycle is long, the dot diameter becomes large, according to the length of the activation cycle. Further, also, nozzles forming dots having different dot diameters from each other in the same head may be provided, or heads one of which comprises a nozzle forming a dot having a different dot diameter from a nozzle of another head may be provided.

In the present embodiment, an image process corresponding to an inkjet printer for forming dots having two types of large and small dot diameters in each color by adjusting the activation cycle of the head will be described.

Figure 3:
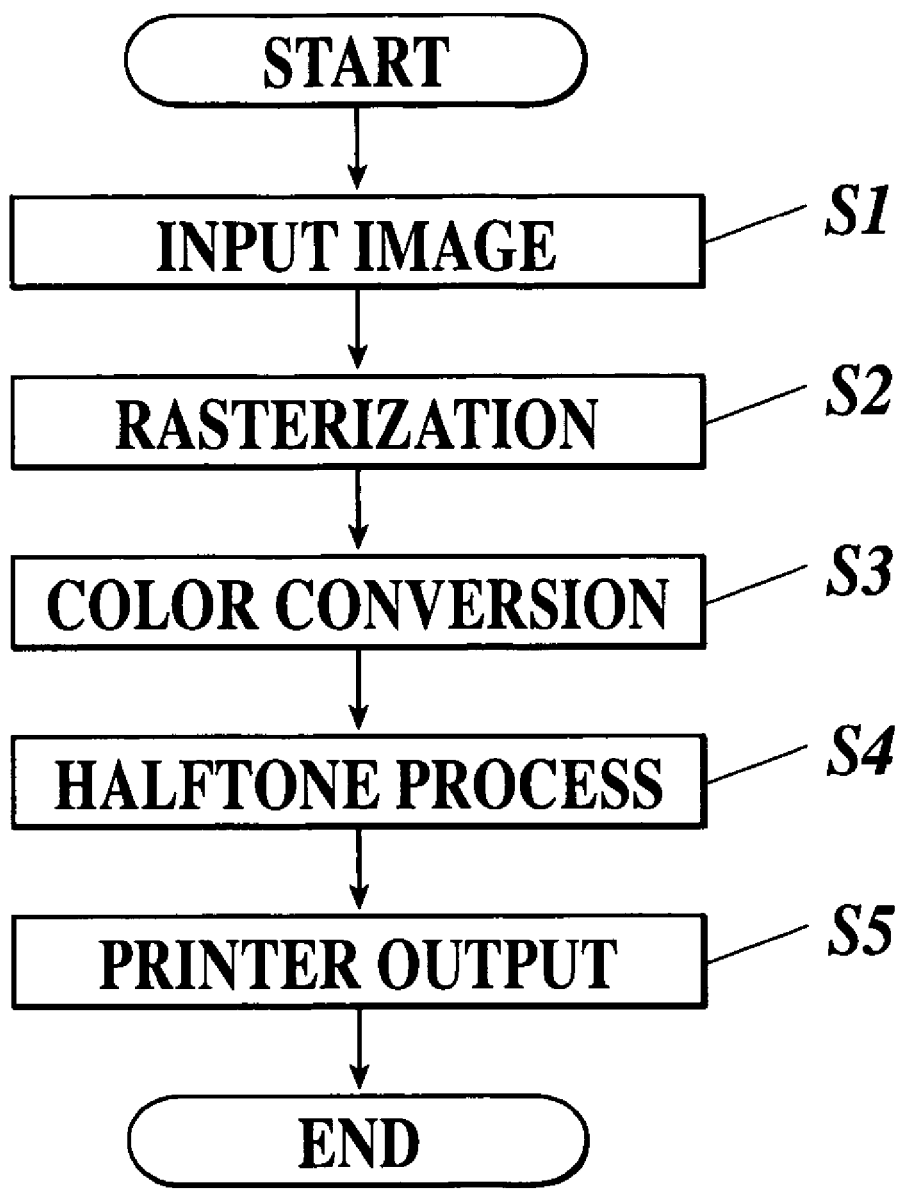
FIG. 3 is a flowchart illustrating a flow from an input of an original image to an output of an output image.

Next, with reference to a flowchart in FIG. 3, a flow from inputting an original image to outputting an output image to a printer will be described.

First, an image data (input value) comprising a multi-gradation image data is inputted to the RAM 4 of the image processing apparatus 1 (Step S1), and the input image is converted from a vector data into a raster data (rasterized) according to necessity (Step S2). Concretely, colors comprising red, green and blue (RGB) shown on a display are converted to a data of CMY(K): cyan, magenta, yellow (and black), in order to print the image on a reflection medium.

Then, a halftone process (detail will be described later) is performed based on the data (Step S4). By the halftone process, a dot type and a dot arrangement are determined.

After the halftone process, an outputting process (printing process) by the printer is performed (Step S5).

Next, with reference to a flowchart of FIG. 4, the halftone process of Step S4 will be described.

Figure 4:
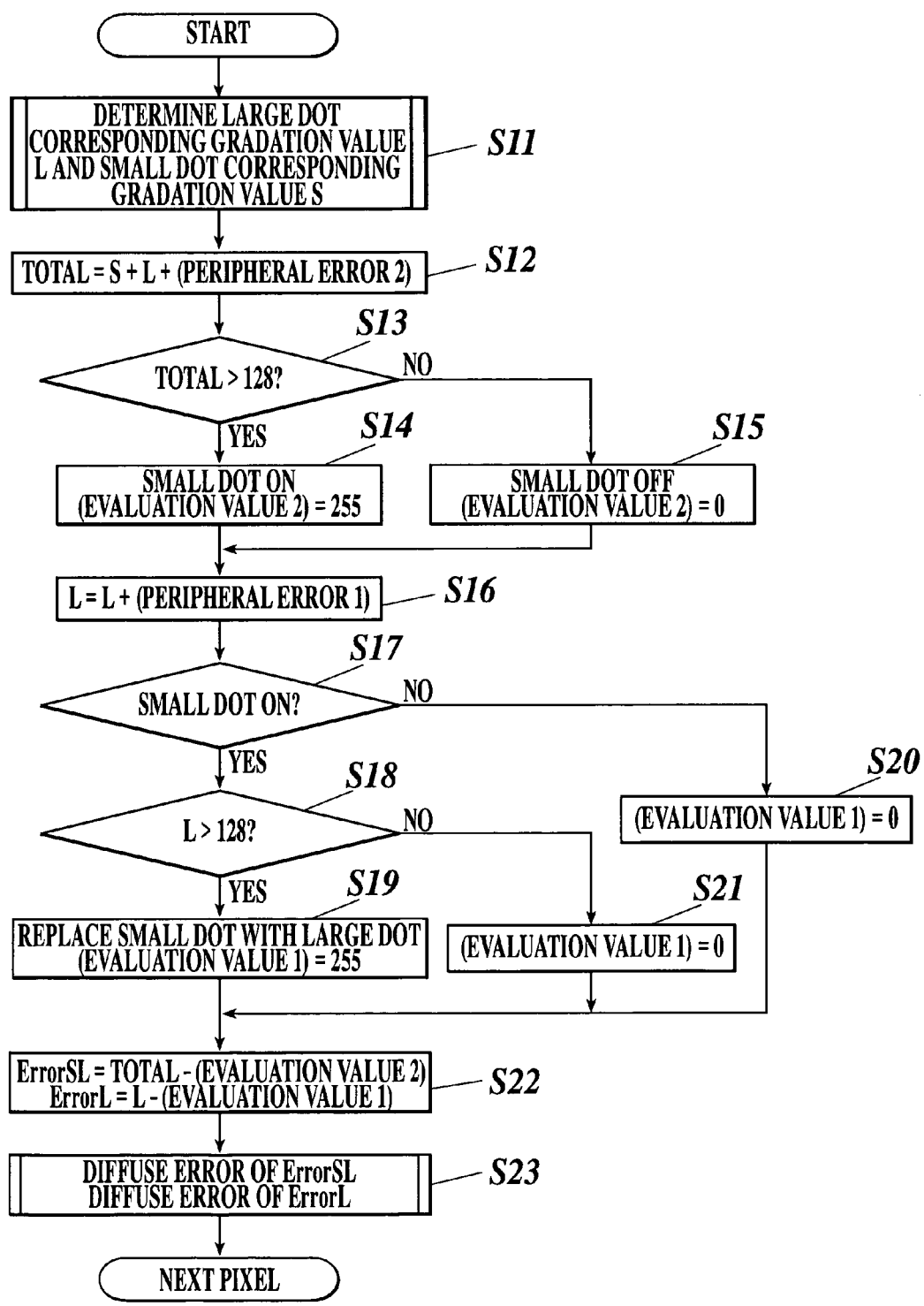
FIG. 4 is a flowchart illustrating a halftone process in a first embodiment.

FIG. 4 shows the halftone process in a case of an inkjet printer for forming dots comprising two types of a large dot and a small dot in each color ink.

Figure 5:
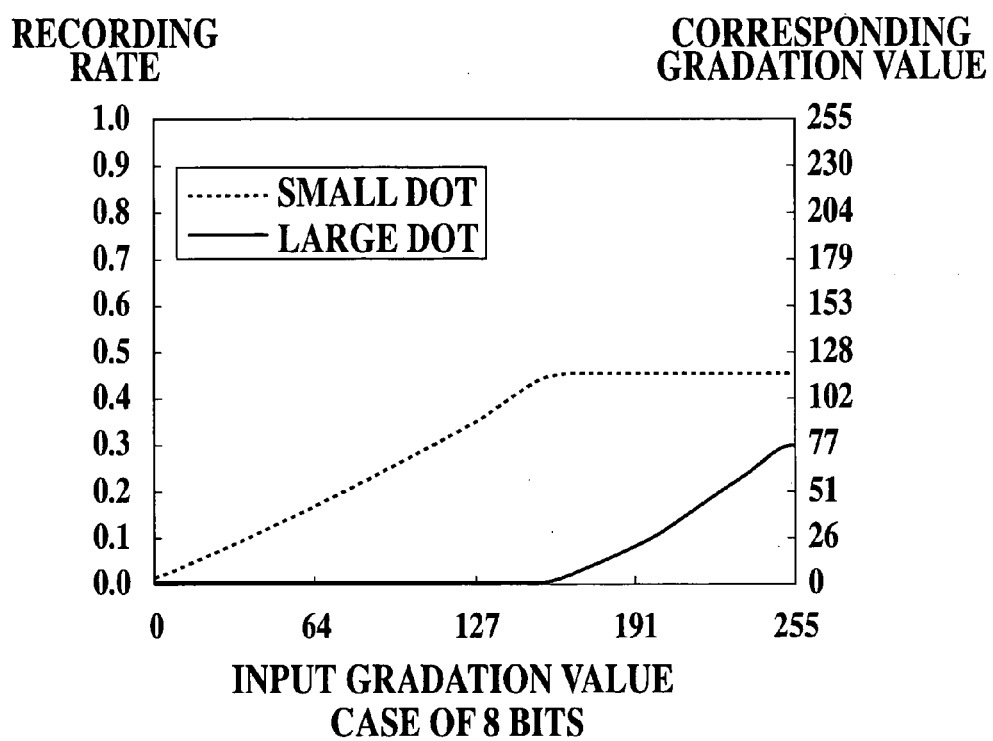
FIG. 5 is a graph showing one example of a table determining rates of each of a large dot and a small dot with respect to a gradation value.

First, by the recording rate determining section 2 (the recording rate determining function of the image processing program) shown in FIG. 1, a recording rate determining step for determining recording rates of a large dot and a small dot is performed to each color of CMYK in the input value, for example with reference to a table shown in FIG. 5 (Step S11).

In FIG. 5, a horizontal axis indicates an input value of an image at each color, and it is assumed that the input value is composed of 8 bits in this case. A vertical axis at the left side indicates a recording rate, and the recording rate is defined as (number of dots to be recorded)/(number of all pixels). A corresponding gradation value of a vertical axis at the right side indicates a value to which the left side vertical axis is allocated according to an 8-bit scale. For example, when the input pixel value is 191, a small dot recording rate is 0.45, and a large dot recording rate is 0.03, respectively. Therefore, a small dot corresponding gradation value S is 114, and a large dot corresponding gradation value L is 7, respectively.

Next, by the dot formation judging section 3 (the dot formation judging function of the image processing program) shown in FIG. 1, a dot formation judging step is performed. In the dot formation judging step of the first embodiment, an error diffusion process is used. The error diffusion process is, as described later, a method in which a gradation error generated on a processed pixel is preliminarily allocated to non-processed pixels with a predetermined weight added, the non-processed pixels being peripheral to the processed pixel, for reflecting the peripheral error to a pixel to be processed.

First, a sum total of the respective corresponding gradation values S and L and the peripheral error corresponding to the sum total (peripheral error 2) are added to each other for obtaining a value as TOTAL (Step S12), and whether TOTAL is more than a predetermined value (here, 128) or not is judged (Step S13).

Here, when TOTAL is more than 128, 255 is assigned to an evaluation value of TOTAL (evaluation value 2), and a small dot is selected (Step S14). On the other hand, when TOTAL is not more than 128, 0 is assigned to the evaluation value 2 and a small dot is not selected (Step S15).

In this way, regardless of whether the dot is large or small, the judgment of whether a dot is to be formed or not is once performed on all the pixels. In the present embodiment, for convenience, a small dot is selected in the dot formation judging step. This is for omitting a step of selecting a small dot when a small dot or a large dot is selected in a dot selecting step, which will be described later. Thereby, it is possible to merge the two steps of selecting a small dot and selecting a large dot, into one step of switching a small dot to a large dot, in the dot selecting step.

Thereafter, by the dot selecting section 4 (the dot selecting function of the image processing program) shown in FIG. 1, the dot selecting step is performed. In the first embodiment, the error diffusion process is used also in the dot selecting step.

Here, a peripheral error corresponding to a large dot (peripheral error 1) is added to the large dot corresponding gradation value L to be re-defined as L (Step S16), and whether a small dot has been formed on the pixel in S14 is judged (Step S17). Here, when it is judged that a small dot has not been formed, 0 is assigned to a large dot evaluation value (evaluation value 1) (Step S20).

On the other hand, when a small dot is formed on the pixel, whether L is more than a predetermined value (here, 128) or not is judged (Step S18). Here, when L is not more than 128, 0 is assigned to the evaluation value 1 as well as S20 (Step S21). In this case, the formation of a small dot is unchanged and determined.

Then, on the pixel on which the small dot is formed, only when L is more than 128, the small dot is replaced with a large dot and 255 is assigned to the evaluation value 1 (Step S19).

Here, the order of the judgments of S17 and S18 is not limited to this case. Conversely, the judgment of S18 may be performed first, and then the judgment of S17 may be performed afterward.

Thereafter, the error corresponding to TOTAL, which is ErrorSL, and the error corresponding to a large dot, which is ErrorL, are calculated in the following way (Step S22).

Figure 6:
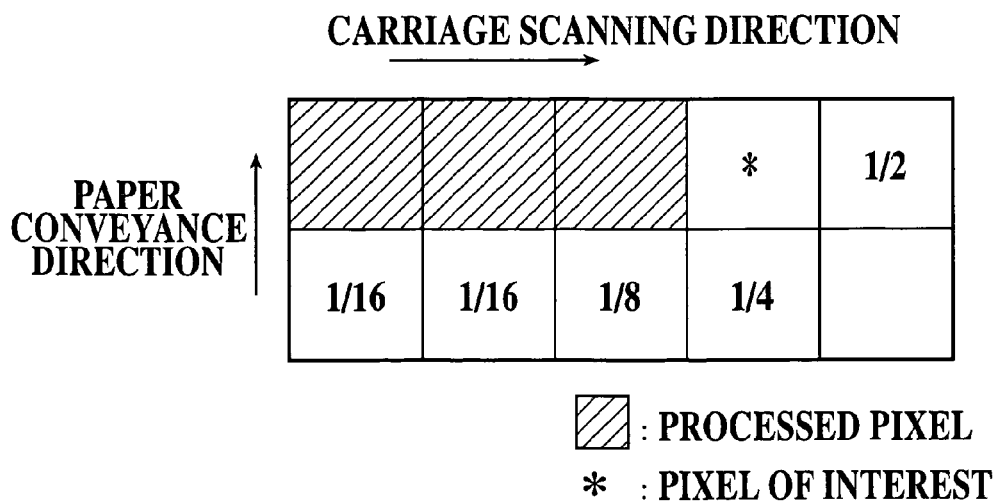
FIG. 6 is a view showing one example of diffusion coefficients when an error generated on a pixel of interest in an error diffusion process is multiplied by the coefficient to be diffused.

$ErrorSL = TOTAL - (\text{evaluation value 2})$ $ErrorL = L - (\text{evaluation value 1})$ Next, the respective errors are distributed to peripheral pixels (Step S23). As a way of distributing the errors, an example is shown in FIG. 6. FIG. 6 shows diffusion coefficients when the error generated on a pixel of interest (*) is multiplied by the coefficient to be diffused. However, the diffusion coefficient is not limited to what is shown in FIG. 6, and various diffusion coefficients can be used.

Such a process is applied to all the pixels that structure the image. When applying the process of FIG. 4 to all the pixels is completed, the halftone process of FIG. 3 is completed.

An example of an image obtained based on the above-mentioned process is shown in FIGS. 7A to 7C.

In the present embodiment, as shown in FIG. 7A, first, an image comprising only small dots is formed by the recording rate determining section 2 and the dot formation judging section 3. Then, according to the recording rate, predetermined dots corresponding to the recording rate among the small dots are replaced with large dots (large dots are applied to the predetermined dots) as shown in FIG. 7B, whereby it is possible to obtain an image having a good diffusion as shown in FIG. 7C.

On the other hand, in the comparative example, an image comprising only small dots is formed by the halftone process of a small dot as shown in FIG. 8A, and an image comprising only large dots is formed by the halftone process of a large dot as shown in FIG. 8B. Then, these images are simply overlapped to obtain an image shown in FIG. 8C. However, when a large dot and a small dot are formed on the same position, the priority is given to the large dot.

When the image of FIG. 7C, which is obtained by the process of the present embodiment, and the image of FIG. 7C by the comparative example are compared, the image obtained in the present embodiment is a better image in view of a diffusion when both the large dots and the small dots are combined to be seen.

Second Embodiment

Next, an image processing method in a second embodiment will be described.

Here, the present embodiment is the same as the first embodiment except that the halftone process in Step S4 is a process shown in a flowchart of FIG. 9. Therefore, descriptions of the identical processes and structure are omitted.

Hereinafter, with reference to the flowchart of FIG. 9, a halftone process in the image processing method in the second embodiment will be described.

First, by the recording rate determining section 2 (the recording rate determining function of the image processing program) shown in FIG. 1, the recording rate determining step for determining recording rates of a large dot and a small dot is performed to each color of CMYK in the input value with reference to a table, for example shown in FIG. 5 (Step S111).

Next, the dot formation judging step is performed by the dot formation judging section 3 (the dot formation judging function of the image processing program) shown in FIG. 1. In the dot formation judging step in the second embodiment, a dither process is used. Here, DITHER(x,y) indicates a threshold matrix which is preliminarily prepared, and in the present embodiment, a threshold matrix called a Bayer type is used therefor. A size of this threshold matrix is 16×16 pixels, wherein all the values of 8-bit gradation values 0 to 255 are included. However, the threshold matrix is not limited to such a case. In the present embodiment, by calculating a remainder of dividing x and y of a pixel position (x,y) by 16, a dither value of DITHER(x%16,y%16) is obtained.

First, by summing the respective corresponding gradation values S and L to define the sum total as TOTAL (Step S112), and whether TOTAL is more than a predetermined value (here, the dither value of DITHER(x%16,y%16)) or not is judged (Step S113).

Here, when TOTAL is more than the dither value, a small dot is selected (Step S114). On the other hand, when TOTAL is not more than the dither value, a small dot is not selected (Step S115).

Thereafter, the dot selecting step is performed by the dot selecting section 4 (the dot selecting function of the image processing program) shown in FIG. 1. In the second embodiment, an error diffusion process is used in the dot selecting step.

Here, a peripheral error corresponding to a large dot (peripheral error 1) is added to the large dot corresponding gradation value L to be re-defined as L (Step S116), and whether a small dot has been formed on the pixel in S114 is judged (Step S117). Here, when it is judged that a small dot has not been formed, 0 is assigned to a large dot evaluation value (evaluation value 1) (Step S120).

On the other hand, when a small dot is formed on the pixel, whether L is more than a predetermined value (here, 128) or not is judged (Step S118). Here, when L is not more than 128, 0 is assigned to the evaluation value 1 as well as S120 (Step S121). In this case, the formation of a small dot is unchanged and determined.

Then, on the pixel on which the small dot is formed, only when L is more than 128, the small dot is replaced with a large dot and 255 is assigned to the evaluation value 1 (Step S119).

Here, the order of the judgments of S117 and S118 is not limited to this case. Conversely, the judgment of S118 may be performed first, and then the judgment of S117 may be performed afterward.

Thereafter, the error corresponding to TOTAL, which is ErrorL, is calculated in the following way (Step S122).

$ErrorL = L - (\text{evaluation value 1})$

Next, the respective errors are distributed to the peripheral pixels (Step S123).

Such a process is applied to all the pixels that structure the image. When applying the process of FIG. 9 to all the pixels is completed, the halftone process of FIG. 3 is completed.

Third Embodiment

Next, an image processing method in a third embodiment will be described.

Figure 10:
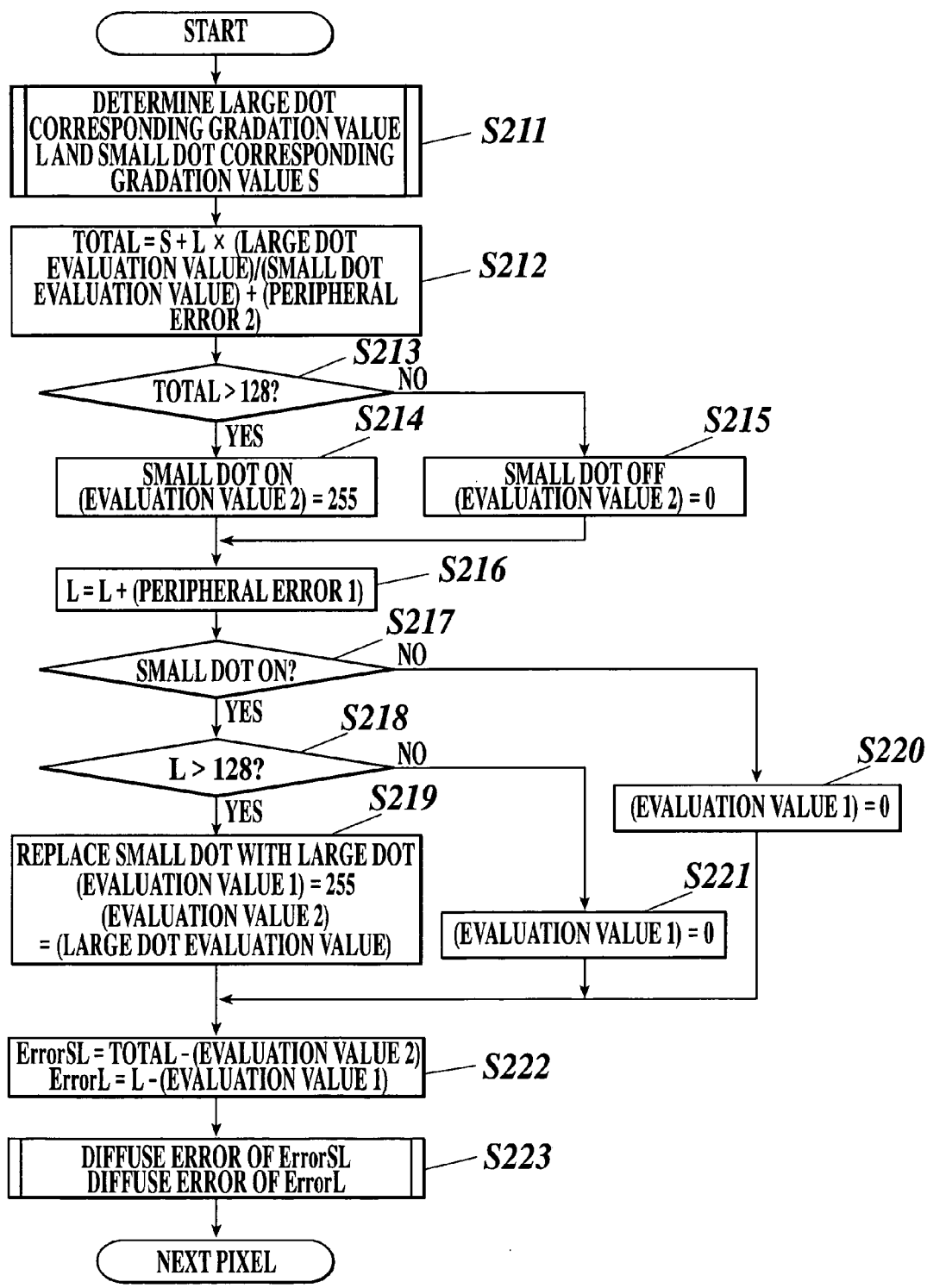
FIG. 10 is a flowchart illustrating a halftone process in a third embodiment.

Here, the present embodiment is the same as the first embodiment except that the halftone process in Step S4 is a process shown in a flowchart of FIG. 10. Therefore, descriptions of the identical processes and structure are omitted.

Hereinafter, with reference to the flowchart of FIG. 10, the halftone process in the image processing method in the third embodiment will be described.

Here, this method is the same as that of the first embodiment except that a correction factor of (large dot evaluation value)/(small dot evaluation value) is multiplied to the large dot recording rate for the calculation of TOTAL, and the evaluation value 2 of TOTAL is replaced with the large dot evaluation value upon selecting a large dot.

First, the recording rate determining step for determining recording rates of a large dot and a small dot is performed to each color of CMYK in the input value with reference to the table, for example shown in FIG. 5, by the recording rate determining section 2 (the recording rate determining function of the image processing program) shown in FIG. 1 (Step S211).

Next, the dot formation judging step is performed by the dot formation judging section 3 (the dot formation judging function of the image processing program) shown in FIG. 1. In the dot formation judging step in the third embodiment, the error diffusion process is used.

Here, a value obtained by multiplying the corresponding gradation value L by the correction factor ((large dot evaluation value)/(small dot evaluation value)) is added to the corresponding gradation value S, and further the peripheral error (peripheral error 2) corresponding to the sum total of S and L is added to the above-mentioned value to be set as TOTAL (Step S212). Then, whether TOTAL is more than a predetermined value (here, 128) or not is judged (Step S213).

Here, when TOTAL is more than 128, 255 is assigned to the evaluation value of TOTAL (evaluation value 2), and a small dot is selected (Step S214). On the other hand, when TOTAL is not more than 128, 0 is assigned to the evaluation value 2 and a small dot is not selected (Step S215).

Thereafter, the dot selecting step is performed by the dot selecting section 4 (the dot selecting function of the image processing program) shown in FIG. 1. In the third embodiment, the error diffusion process is used also in the dot selecting step.

Here, a peripheral error corresponding to a large dot (peripheral error 1) is added to the large dot corresponding gradation value L to be re-defined as L (Step S216), and whether a small dot has been formed on the pixel in S214 is judged (Step S217). Here, when it is judged that a small dot has not been formed, 0 is assigned to a large dot evaluation value (evaluation value 1) (Step S220).

On the other hand, when a small dot is formed on the pixel, whether L is more than a predetermined value (here, 128) or not is judged (Step S218) Here, when L is not more than 128, 0 is assigned to the evaluation value 1 as well as S220 (Step S221). In this case, the formation of a small dot is unchanged and determined.

Then, on the pixel on which the small dot is formed, only when L is more than 128, the small dot is replaced with a large dot and 255 is assigned to the evaluation value 1 (Step S219).

Here, the order of the judgments of S217 and S218 is not limited to this case. Conversely, the judgment of S218 may be performed first, and then the judgment of S217 may be performed afterward.

Thereafter, the error corresponding to TOTAL, which is ErrorSL, and the error corresponding to a large dot, which is ErrorL, are calculated in the following way (Step S222).

$ErrorSL = TOTAL - (\text{evaluation value 2})$ $ErrorL = L - (\text{evaluation value 1})$ Next, the respective errors are distributed to the peripheral pixels (Step S223).

Such a process is applied to all the pixels structuring the image. When applying the process of FIG. 10 to all the pixels is completed, the halftone process of FIG. 3 is completed.

Here, in the above-mentioned first, second and third embodiments, by adding the peripheral error 1 to the large dot corresponding gradation value L, a diffusion is improved.

Further, by using the halftone process in the third embodiment, when a large dot is formed, a corresponding large negative error is diffused to peripheral pixels. Therefore, a small dot is not as easily formed around the large dot as the first embodiment.

Thereby, it is possible to perform a dot arrangement in consideration of a dot diameter of the large dot. Further, since an optimal dot arrangement is made by influencing a large dot and a small dot to each other, large amount of disturbance in small dots due to a large dot hardly occurs, and further it is possible to reduce a granularity more. This effect will be described in detail with reference to FIG. 11.

As a precondition, it is assumed that both the large dot and the small dot are processed as 8-bit data, the small dot evaluation value is 255, the large dot evaluation value is 765, and (S+L×(large dot evaluation value)/(small dot evaluation value)) in Step S212 of FIG. 10 is $\alpha$. Further, especially in the following descriptions, the range of $\alpha$ is limited between 0 and 255. The reason of this limitation is, within an area in which a plurality of dots are mixed (in this description, an area in which large dots and small dots are mixed), a deterioration of an image can be seen especially where a dot density of large dots is low. Since this area is used for the comparison, the range of $\alpha$ is limited in the above-mentioned way.

First, since a threshold for judging whether a small dot is to be formed or not in Step S213 of FIG. 10 is 128, a possible error range for the judgment of whether a small dot is to be formed or not is limited between −128 and 128. Therefore, in Step S212 of FIG. 10, a range of TOTAL (=input value $\alpha$+peripheral error) should satisfy: $-128+\alpha < TOTAL < 128+\alpha$. However, this does not mean that a has a width, and $\alpha$ is a fixed value. As a condition for making a large dot ON, it is necessary that a small dot is ON in FIG. FIG. 10 (Step S217). Therefore, on the pixel on which a large dot is to be ON, TOTAL should at least satisfy: TOTAL>128. In other words, if the condition of $128 < TOTAL < 128+\alpha$ is not satisfied, it is not possible to form a large dot. Here, when a large dot is formed, since ErrorSL satisfies ErrorSL=TOTAL−765 in the step of calculating the error (Step S222), a possible range of the ErrorSL should satisfy: $-637 < ErrorSL < -637+\alpha$. On the other hand, in the method disclosed in Japanese Patent No. 3208777 (a process in which a large dot is first determined and its error is added to a small dot), a large dot is generated regardless of a state of a small dot. Therefore, by defining an error as for when a large dot is generated as Error, Error satisfies: $-891+\alpha < Error < -637+\alpha$. These ErrorSL and Error are factors for reflecting an influence of the formation of a large dot to a small dot. Therefore, in a case of a smaller variation of the ErrorSL, that is a case in which a halftone process is performed to all the dots that are a sum of large dots and small dots, and then a large dot is selected, it is possible to obtain a more uniform effect in consideration of dots, and thereby the image quality is improved.

Next, an alternative example of the third embodiment will be described.

Figure 12A:
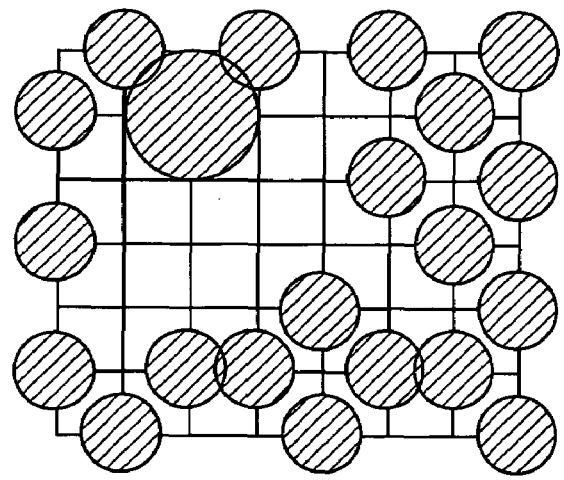
FIGS. 12A and 12B are explanatory views of an alternative example in the third embodiment.
Figure 12B:
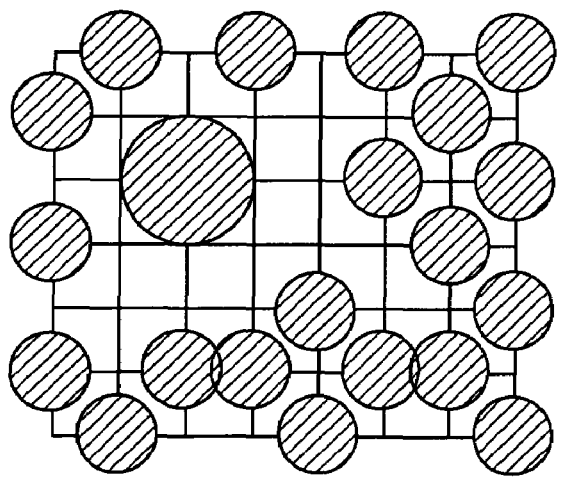

In the alternative example, although a method of separately plotting two types of dots is the same as that of the third embodiment, thereafter, when the data is transmitted to a printer, a method of shifting the large dot to a direction of an error diffusion as much as several pixels is used. This method is effective when there is a large difference between the small dot evaluation value and the large dot evaluation value ((large dot evaluation value)/(small dot evaluation value)>3), that is when a large space in which a small dot is not generated is formed around a large dot. This is because, in the third embodiment, as shown in FIG. 12A, a large dot does not always exist at an appropriate position within the space, but in such a case, it is possible to realize a dot arrangement shown in FIG. 12B by applying the alternative example of the third embodiment. As a result, it is possible to reduce a granularity, and also to obtain an image to which an influence of a dropping position deviation in an actual printing step is scarcely reflected.

Fourth Embodiment

Next, an image processing method in a fourth embodiment will be described.

In the present embodiment, a halftone process in a case of an inkjet printer forming a three types of dots: large, medium and small, in each color will be described. Here, descriptions of the identical process and structure to the first embodiment will be omitted.

Figure 13:
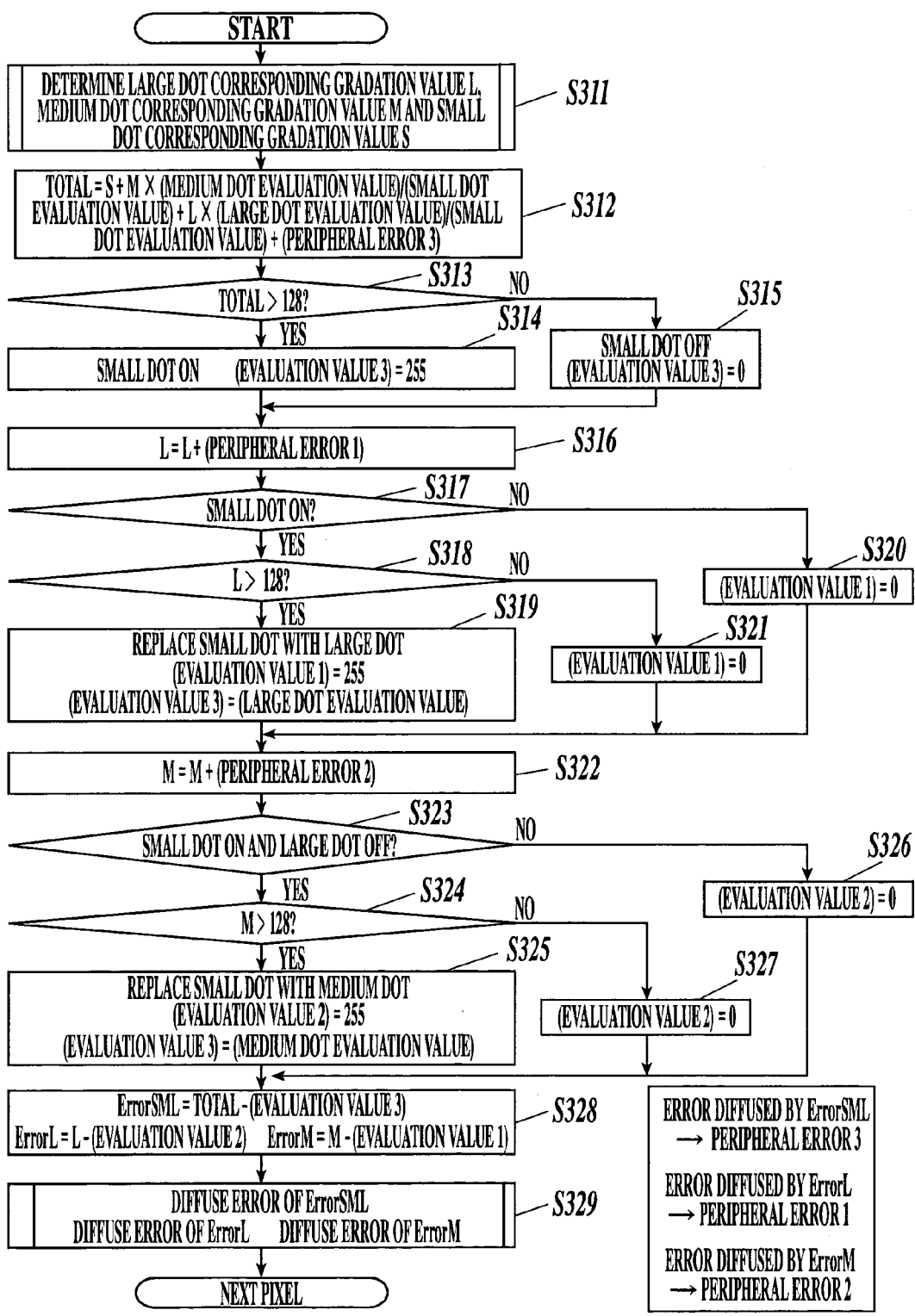
FIG. 13 is a flowchart illustrating a halftone process in a fourth embodiment.

Hereinafter, with reference to a flowchart illustrated in FIG. 13, the halftone process in the image processing method in the fourth embodiment will be described.

Figure 14:
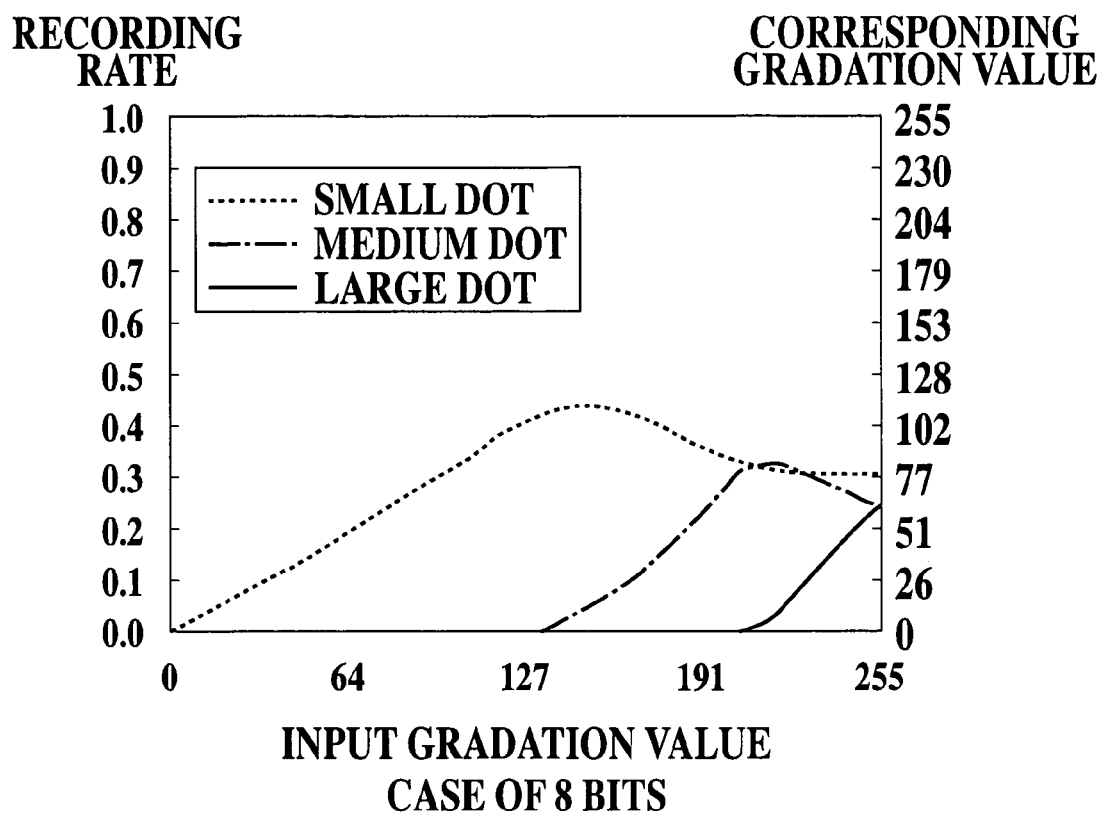
FIG. 14 is a graph showing one example of a table determining rates of respective large, medium and small dots with respect to the gradation value.

First, the recording rate determining step is performed for determining recording rates among large dots, medium dots and small dots is performed to each color of CMYK in the input value with reference to a table, for example shown in FIG. 14, by the recording rate determining section 2 (the recording rate determining function of the image processing program) shown in FIG. 1 (Step S311).

Next, the dot formation judging step is performed by the dot formation judging section 3 (the dot formation judging function of the image processing program) shown in FIG. 1. In the dot formation judging step in the third embodiment, the error diffusion process is used.

Here, a value obtained by multiplying the corresponding gradation value M by a correction factor ((medium dot evaluation value)/(small dot evaluation value)) is added to the corresponding gradation value S, and further a value obtained by multiplying the corresponding gradation value L by a correction factor ((large dot evaluation value)/(small dot evaluation value)) is added to the above-mentioned value, and further a peripheral error (peripheral error 3) corresponding to the sum total of S, M and L is added to the above-mentioned value to be set as TOTAL (Step S312). Then, whether TOTAL is more than a predetermined value (here, 128) or not is judged (Step S313).

Here, when TOTAL is more than 128, 255 is assigned to the evaluation value of TOTAL (evaluation value 3), and a small dot is selected (Step S314). On the other hand, when TOTAL is not more than 128, 0 is assigned to the evaluation value 3 and a small dot is not selected (Step S315).

Thereafter, the dot selecting step is performed by the dot selecting section 4 (the dot selecting function of the image processing program) shown in FIG. 1. In the fourth embodiment, the error diffusion process is used also in the dot selecting step.

Here, a peripheral error corresponding to a large dot (peripheral error 1) is added to the large dot corresponding gradation value L to be re-defined as L (Step S316), and whether a small dot has been formed on the pixel in S314 is judged (Step S317). Here, when it is judged that a small dot has not been formed, 0 is assigned to a large dot evaluation value (evaluation value 1) (Step S320).

On the other hand, when a small dot is formed on the pixel, whether L is more than a predetermined value (here, 128) or not is judged (Step S318). Here, when L is not more than 128, 0 is assigned to the evaluation value 1 as well as S320 (Step S321). In this case, the formation of a small dot is unchanged and determined.

Then, at the pixel on which the small dot is formed, only when L is more than 128, the small dot is replaced with a large dot, 255 is assigned to the evaluation value 1 and the evaluation value is replaced with the large dot evaluation value (Step S319).

Here, the order of the judgments of S317 and S318 is not limited to this case. Conversely, the judgment of S318 may be performed first, and then the judgment of S317 may be performed afterward.

Next, a peripheral error corresponding to a medium dot (peripheral error 2) is added to the medium dot corresponding gradation value M to be re-defined as M (Step S322), and on the pixel, whether a small dot has been formed in S314 and the small dot has been replaced with a large dot in S319 is judged (Step S323). Here, when it is judged that a small dot has not been formed and a large dot is formed, 0 is assigned to the medium dot evaluation value (evaluation value 2) (Step S326).

On the other hand, when it is judged that a small dot has been formed and a large dot has not been formed on the pixel, whether M is more than a predetermined value (here, 128) or not is judged (Step S324). Here, when M is not more than 128, 0 is assigned to the evaluation value 2 as well as S326 (Step S327). In this case, the formation of the small dot is unchanged and determined.

Then, on the pixel on which the small dot is formed and a large dot is not formed, only when M is more than 128, the small dot is replaced with a medium dot, 255 is assigned to the evaluation value 2, and the evaluation value is replaced with the medium dot evaluation value (Step S325).

Here, the order of judgments of S323 and S324 is not limited to this case. Conversely, the judgment of S324 may be performed first, and then the judgment of S323 may be performed afterward.

Thereafter, the error corresponding to TOTAL, which is ErrorSML, the error corresponding to a large dot, which is ErrorL, and the error corresponding to a medium dot, which is ErrorM, are calculated in the following way (Step S328)

$$ErrorSML = TOTAL - (\text{evaluation value 3})$$

$$ErrorL = L - (\text{evaluation value 2})$$

$$ErrorM = L - (\text{evaluation value 1})$$

Next, the respective errors are distributed to the peripheral pixels (Step S329).

Such a process is applied to all the pixels that structure the image. When applying the process of FIG. 13 to all the pixels is completed, the halftone process of FIG. 3 is completed.

As mentioned above, according to the image processing apparatus in each of the mentioned embodiments, the image processing apparatus comprises: a recording rate determining section for determining a recording rate of each of a plurality of dot types having different densities per unit area from each other according to an input value comprising a multi-gradation image data, the plurality of dot types of which a dot is formed by quantizing the input value; a dot formation judging section for judging whether a dot is to be formed on each pixel based on a total recording rate which is a sum of each recording rate of each dot type determined by the recording rate determining section; and a dot selecting section for selecting a dot type among the plurality of dot types having different densities from each other, to a pixel on which the dot formation judging section judges that the dot is to be formed. Thereby, the recording rate of each of the plurality of dot types having different densities per unit area from each other according to the input value is determined, and a halftone process for judging whether a dot is to be formed or not is performed according to the sum of the recording rates. Since ON/OFF of all the dots having the plurality of dot types having different densities is determined by this process, it is possible to improve the diffusion of all the dots having the plurality of dot types having different densities.

As a result, it is possible to form a favorable image.

Further, the image processing apparatus in each of the embodiments, concretely comprises: a recording rate determining section for determining a recording rate of each of a plurality of dot types having different densities per unit area from each other according to an input value comprising a multi-gradation image data, the plurality of dot types of which a dot is formed by quantizing the input value; a dot formation judging section for determining a total recording rate by summing each recording rate of the plurality of dot types having different densities per unit area from each other determined by the recording rate determining section, and for judging whether a dot of a dot type among the plurality of dot types having different densities per unit area from each other is to be formed temporarily on each pixel based on the total recording rate; and a dot selecting section for selecting whether a pixel on which the dot of the dot type among the plurality of dot types having different densities per unit area from each other is to be formed temporarily is to be replaced with a dot of another type among the plurality of dot types having different densities per unit area from each other. Therefore, a recording rate of each of the plurality of dot types having different densities per unit area from each other is determined according to the input value, and a halftone process for judging whether a dot is to be formed is performed according to the sum of the recording rates. Since ON/OFF of all the dots is determined regardless any of the plurality of dot types having different densities from each other, it is possible to improve a dot diffusion of all the dots having the plurality of dot types having different densities from each other.

As a result, it is possible to form a favorable image.

Here, in each of the embodiments, the dots having the plurality of dot types having different densities per unit area are dots of a plurality of dot types having ink densities changed in an identical color and/or dots of a plurality of dot types having dot diameters changed in an identical color.

Further, the recording rate determining section is to determine an appearance probability of a dot of each of the plurality of dot types having different densities per unit area from each other, within a predetermined pixel area, as a recording rate of each of the plurality of dot types.

Further, in each of the embodiments, the dot selecting section selects a dot type to a pixel on which a dot is to be formed based on the input value and each recording rate of the plurality of dot types having different densities per unit area from each other.

Further, in each of the embodiments, since the dot selecting section selects a dot type in the order from a dot type having a higher density per unit area to a dot type having a lower density per unit area to a pixel on which a dot is to be formed, when each dot type is selected, it is possible to earlier select the dot type having a higher density, which is easily noticeable, in consideration of a dot diffusion of the dot type having a higher density.

As a result, it is possible to obtain an optimal dot diffusion of a dot type having a higher density, and thereby it is possible to obtain a more favorable image.

Further, in each of the embodiments, since the dot selecting section selects a dot type among the plurality of dot types according to the error diffusion process, to a pixel on which a dot is to be formed, it is possible to secure a significantly favorable dot diffusion in regard to the selected dot type.

As a result, it is possible to obtain a more favorable image.

Furthermore, in the first, third and fourth embodiments, since the dot formation judging section judges whether a dot is to be formed on each pixel according to the error diffusion process, it is possible to perform a refined quantization.

As a result, it is possible to obtain a high-quality image.

Further, in the second embodiment, since the dot formation judging section judges whether a dot is to be formed on each pixel according to the dither process, it is possible to perform a quantization with an easy process.

As a result, it is possible to reduce a processing time.

Further, in the third and fourth embodiments, since the dot formation judging section corrects an error amount generated on the pixel in the error diffusion process according to a density of the dot type selected by the dot selecting section, it is possible to reflect the density of the dot type which already has been selected by the dot selecting section to the dot formation judging section, whereby it is possible to secure a diffusion in consideration of a dot density.

As a result, it is possible to form a more high-quality image.

Further, in the first, second and third embodiments, dots having two dot types having different densities per unit area from each other are formed by quantizing an input value comprising a multi-gradation image data, the recording rate determining section determines a recording rate of each of the two dot types having different densities per unit area from each other, the dot formation judging section judges whether a dot is to be formed on each pixel based on a total recording rate which is a sum total of each recording rate of the two dot types having different densities per unit area from each other, and the dot selecting section selects a dot type between the two dot types having different densities per unit area from each other to a pixel on which the dot formation judging section judges that the dot is to be formed. Thereby, an image is formed from the dots of the two types having different densities per unit area from each other.

Further, in the fourth embodiment, dots having three dot types having different densities per unit area from each other are formed by quantizing an input value comprising a multi-gradation image data, the recording rate determining section determines a recording rate of each of the three dot types having different densities per unit area from each other, the dot formation judging section judges whether a dot is to be formed on each pixel based on a total recording rate which is a sum total of each recording rate of the three dot types having different densities per unit area from each other, determined by the recording rate determining section, and the dot selecting section selects a dot type among the three dot types having different densities per unit area from each other to a pixel on which the dot formation judging section judges that the dot is to be formed. Thereby, an image is formed from the dots of the three dot types having different densities per unit area from each other.

Further, also by the image processing method and the image processing program in the present embodiments, it is possible to have the same effect as the above-mentioned image processing apparatus.

Here, the present invention is not limited to the above-mentioned embodiments. With regard to the present invention, various modifications and design changes may be applied without departing the gist thereof.

For example, the output value and the evaluation value in each of the above-mentioned embodiments may be changed according to a bit number and a quantization gradation number of the process. Further, the output value relies on an output system. For example, the input value may be quantized into not less than four values.

Further, the image processing apparatus may comprise: a recording rate determining section for determining at least one recording rate of a plurality of dot types having different densities per unit area from each other according to an input value comprising a multi-gradation image data, the plurality of dot types of which a dot is formed by quantizing the input value, and for determining a total recording rate which is a sum total of each recording rate of the plurality of dot types having different densities per unit area from each other; a dot formation judging section for judging whether a dot is to be formed on each pixel based on the total recording rate determined by the recording rate determining section; and a dot selecting section for selecting a dot type among the plurality of dot types to a pixel on which the dot formation judging section judges that the dot is to be formed.

According to such an image processing apparatus, a halftone process for determining at least one recording rate of the plurality of dot types having different densities per unit area from each other according to the input value, for determining a total recording rate which is a sum total of each recording rate of the plurality of dot types having different densities per unit area from each other, and for judging whether a dot is to be formed according to the total recording rate, is performed. For example, in the halftone process in a case of an inkjet printer forming dots having two types comprising a large dot and a small dot per each ink color, the recording rate determining section determines recording rates of a large dot and a total recording rate. Thereafter, as well as the above-mentioned embodiments, a halftone process for judging whether a dot is to be formed according to the total recording rate is performed.

By this process, as well as the above-mentioned embodiments, ON/OFF of all the dots having the dot types having different densities is determined. Therefore, it is possible to improve a dot diffusion of all the dots having the dot types having different densities.

As a result, it is possible to form a favorable image.

The entire disclosure of a Japanese Patent Application No. Tokugan 2004-142271 filed on May 12, 2004, including specifications, claims, drawings and summaries are incorporated herein by reference in their entirety.

What is claimed is:

1. An image processing apparatus comprising:
a recording rate determining section for determining a recording rate of each of a plurality of dot types having different densities per unit area from each other according to an input value comprising a multi-gradation image data, the input value being quantized for forming a dot of the plurality of dot types;
a dot formation judging section for judging whether the dot is to be formed on each pixel based on a total recording rate which is a sum total of each recording rate of the plurality of dot types, determined by the recording rate determining section; and
a dot selecting section for selecting a dot type among the plurality of dot types having different densities per unit area from each other, to a pixel on which the dot formation judging section judges that the dot is to be formed,
wherein an image is formed according to an arrangement distribution of the dot.

2. The apparatus of claim 1, wherein
the plurality of dot types having different densities per unit area from each other are a plurality of dot types having ink densities changed from each other in an identical color and/or a plurality of dot types having different dot diameters from each other in the identical color.

3. The apparatus of claim 1, wherein
the recording rate determining section determines an appearance probability of the dot of each of the plurality of dot types having different densities per unit area from each other, within a predetermined pixel area, as the recording rate of each of the plurality of dot types having different densities per unit area from each other.

4. The apparatus of claim 1, wherein
the dot formation judging section judges whether the dot is to be formed on each pixel according to an error diffusion process.

5. The apparatus of claim 1, wherein
the dot formation judging section judges whether the dot is to be formed on each pixel according to a dither process.

6. The apparatus of claim 4, wherein
the dot formation judging section corrects an error amount generated on each pixel in the error diffusion process according to a dot density of the dot type selected by the dot selecting section.

7. The apparatus of claim 1, wherein
the dot selecting section selects the dot type based on the input value and each recording rate of the plurality of dot types having different densities per unit area from each other, to the pixel on which it is judged that the dot is to be formed.

8. The apparatus of claim 1, wherein
the dot selecting section selects the dot type in an order from a dot type having a higher density per unit area to a dot type having a lower density per unit area, to the pixel on which it is judged that the dot is to be formed.

9. The apparatus of claim 1, wherein
the dot selecting section selects the dot type among the plurality of dot types having different densities per unit area from each other according to an error diffusion process, to the pixel on which it is judged that the dot is to be formed.

10. The apparatus of claim 1, wherein
dots of two types having different densities per unit area from each other are formed by quantizing the input value comprising the multi-gradation image data,
the recording rate determining section determines a recording rate of each of the two dot types having different densities per unit area from each other;
the dot formation judging section judges whether the dot is to be formed on each pixel based on the total recording rate which is the sum total of each recording rate of the two dot types having different densities per unit area from each other, determined by the recording rate determining section, and
the dot selecting section selects a dot type between the two dot types having different densities per unit area from each other, to the pixel on which the dot formation judging section judges that the dot is to be formed.

11. The apparatus of claim 1, wherein
dots of three dot types having different densities per unit area from each other are formed by quantizing the input value comprising the multi-gradation image data,
the recording rate determining section determines a recording rate of each of the three dot types having different densities per unit type from each other,
the dot formation judging section judges whether the dot is to be formed on each pixel based on the total recording rate which is the sum total of each recording rate of the three dot types having different densities per unit area from each other, determined by the recording rate determining section, and
the dot selecting section selects a dot type among the three dot types having different densities per unit area from each other, to the pixel on which the dot formation judging section judges that the dot is to be formed.

12. An image processing apparatus comprising:
a recording rate determining section for determining a recording rate of each of a plurality of dot types having different densities per unit area from each other according to an input value comprising a multi-gradation image data, the input value being quantized for forming a dot of the plurality of dot types;
a dot formation judging section for determining a total recording rate by summing each recording rate of the plurality of dot types having different densities per unit area from each other, and for judging whether a dot of a dot type among the plurality of dot types having different densities per unit area from each other is to be formed on each pixel temporarily, based on the total recording rate; and
a dot selecting section for selecting whether to replace the dot of the dot type among the plurality of dot types having different densities per unit area from each other, judged to be formed on the pixel temporarily by the dot formation judging section, with a dot of another dot type among the plurality of dot types having different densities per unit area from each other,
wherein an image is formed according to an arrangement distribution of the dot.

13. An image processing apparatus comprising:
a recording rate determining section for determining at least one recording rate of a dot type among a plurality of dot types having different densities per unit area from each other according to an input value comprising a multi-gradation image data, the input value being quantized for forming a dot of the plurality of dot types, and for determining a total recording rate which is a sum total of each recording rate of the plurality of dot types having different densities per unit area from each other;

a dot formation judging section for judging whether the dot is to be formed on each pixel based on the total recording rate determined by the recording rate determining section;

a dot selecting section for selecting a dot type among the plurality of dot types having different densities per unit area from each other, to a pixel on which the dot formation judging section judges that the dot is to be formed, wherein an image is formed according to an arrangement distribution of the dot.

14. An image processing method comprising:

determining a recording rate of each of a plurality of dot types having different densities per unit area from each other according to an input value comprising a multi-gradation image data, the input value being quantized for forming a dot;

judging whether the dot is to be formed on each pixel based on a total recording rate which is a sum total of each determined recording rate of the plurality of dot types having different densities per unit area from each other; and selecting a dot type among the plurality of dot types having different densities per unit area from each other, to a pixel on which it is judged that the dot is to be formed, wherein an image is formed according to an arrangement distribution of the dot.

15. The method of claim 14, wherein
the judging comprises judging whether the dot is to be formed on each pixel according to an error diffusion process.

16. The method of claim 14, wherein
the judging comprises judging whether the dot is to be formed on each pixel according to a dither process.

17. The method of claim 15, wherein
the judging comprises correcting an error amount generated on the pixel in the error diffusion process, according to a dot density of the selected dot type.

18. The method of claim 14, wherein
the selecting comprises selecting the dot type to the pixel on which it is judged that the dot is to be formed, based on the input value and each recording rate of the plurality of dot types having different densities per unit area from each other.

19. The method of claim 14, wherein
the selecting comprises selecting the dot type in an order from a dot type having a higher density per unit area to a dot type having a lower density per unit area, to the pixel on which it is judged that the dot is to be formed.

20. The method of claim 14, wherein
the selecting comprises selecting the dot type among the plurality of dot types having different densities per unit area from each other according to an error diffusion process, to the pixel on which it is judged that the dot is to be formed.

* * * * *